United States Patent [19]
Nishimiya

[11] 3,964,454
[45] June 22, 1976

[54] DIFFERENTIAL IGNITION TIMING FIRING CONTROL SYSTEM

[75] Inventor: Torazō Nishimiya, Mito, Japan

[73] Assignee: Hitachi, Ltd., Japan

[22] Filed: June 21, 1974

[21] Appl. No.: 481,825

[30] Foreign Application Priority Data
July 6, 1973 Japan.............................. 45-75679
Sept. 28, 1973 Japan............................ 45-108414

[52] U.S. Cl......................... 123/148 DS; 123/8.09; 123/8.45; 123/117 R
[51] Int. Cl.²..................... F02P 3/02; F02B 75/10
[58] Field of Search............. 123/8.09, 8.45, 117 R, 123/148 DS

[56] References Cited
UNITED STATES PATENTS

| | | | |
|---|---|---|---|
| 3,584,608 | 6/1971 | Shibagaki...................... | 123/117 R |
| 3,716,991 | 2/1973 | Tatsutomi et al.............. | 123/117 R |
| 3,717,135 | 2/1973 | Mayashi et al................. | 123/117 R |
| 3,791,356 | 2/1974 | Saita............................... | 123/117 R |
| 3,828,752 | 8/1974 | Hioki et al..................... | 123/148 DS |

Primary Examiner—Wendell E. Burns
Assistant Examiner—James W. Cranson
Attorney, Agent, or Firm—Craig & Antonelli

[57] ABSTRACT

A control system for controlling the ignition of fuel in an internal combustion engine with differential ignition timing comprising a first and a second ignition plug disposed in each combustion chamber of the engine, and a first and a second ignition system associated with the first and second ignition plugs respectively. A pulse delay circuit is provided in the second ignition system and the time constant thereof is varied depending on the operating condition of the engine for varying the rate of delay of the ignition timing of the second ignition plug in the second ignition system relative to the ignition timing of the first ignition plug in the first ignition system. This delay time is reduced in an operating range requiring a high engine output so that the demand for purificaton of exhaust gases and the demand for desired operating performance of the engine which are contradictory to each other can be satisfied.

18 Claims, 8 Drawing Figures

DIFFERENTIAL IGNITION TIMING FIRING CONTROL SYSTEM

This invention relates to an ignition control system suitable for gasoline engines, and more particularly to a system of the kind above described which is effectively used for the purification of engine exhaust gases.

It is commonly known that supply of a so-called lean fuel-air mixture to an internal combustion engine operating with gasoline is an effective method for reducing the quantities of carbon monoxide CO, unburnt hydrocarbons HC and nitrogen oxides $NO_x$ contained in the engine exhaust gases. However, operation of the engine with such lean fuel-air mixture was basically defective in that the engine output was reduced and the operating performance of the engine was also greatly reduced. In an effort to eliminate this undesirable reduction in the engine output, a so-called multiple ignition combustion method has been proposed in which two ignition plugs are disposed in each combustion chamber of an engine to be simultaneously energized for the ignition of fuel-air mixture. Although this method has been effective in eliminating the reduction of the engine output, it has been disadvantageous in that the quantity of $NO_x$ tends to increase due to the temperature rise in the combustion chambers of the engine. Therefore, in order to generally decrease the quantity of $NO_x$ in the engine exhaust gases, it is effective to greatly delay the ignition timing in a steady operation range of the engine in which a relatively low output is required.

The delay of the ignition timing in such an operation range is effective in that both the reduction in the quantity of $NO_x$ and the engine operating performance requirement are simultaneously satisfied under a specific operating condition, that is, in the steady operation range of the engine. However, when a higher output is required and the speed of the engine is increased by strongly depressing the accelerator pedal or fully opening the engine throttle valve, the desired engine output cannot be developed and the desired engine operating performance cannot be obtained due to the fact that the engine output is reduced by an amount corresponding to the delay of the ignition timing.

This undesirable reduction of the engine output in the high output range can be remedied by a method of control in which the ignition phase of one of the two ignition plugs is normally delayed by several degrees relative to that of the other ignition plug, and during acceleration, the ignition phase of the former ignition plug is advanced by a degree corresponding to the desired acceleration or such ignition phase is advanced to coincide with that of the latter ignition plug as required. In other words, an ignition timing control method is strongly demanded in which priority is given to the purification of the engine exhaust gases in the steady operation range in which a high output is not required, while priority is given to the operating performance of the engine in the accelerating and other conditions in which a high output is required so that both the demand for purification of the engine exhaust gases and the demand for engine operating performance can be simultaneously satisfied under all the operating conditions of the engine. The present invention contemplates the provision of a control system which satisfies the contradictory demands above described.

It is an object of the present invention to provide a differential ignition timing control system suitable for an internal combustion engine of the multiple ignition combustion type employing two ignition plugs in each combustion chamber, in which the difference between the ignition timing of one of the ignition plugs and that of the other ignition plug is variable and can be most suitably controlled to suit the desired exhaust gas concentration and desired engine output.

Another object of the present invention is to provide a system of the above character which prevents undesirable reductions of the engine operating performance in the accelerating and other conditions while reducing the exhaust gas concentration to a minimum so as to simultaneously satisfy both the demand for purification of the engine exhaust gases and the demand for engine operation performance.

Still another object of the present invention is to provide a system of the above character in which the prior art mechanical contact type ignition timing detector is replaced by a contactless ignition timing detector which detects the ignition timing of the second ignition plug to energize same so as to extend the service life and eliminate mal-operation of the ignition system due to noise.

Yet another object of the present invention is to provide a system of the above character which is not adversely affected by high-frequency noise appearing from the high-voltage ignition system and which is small in size, light in weight and inexpensive.

The above and other objects, features and advantages of the present invention will be apparent from the following detailed description taken in conjunction with the accompanying drawings, in which.

Figure 1:
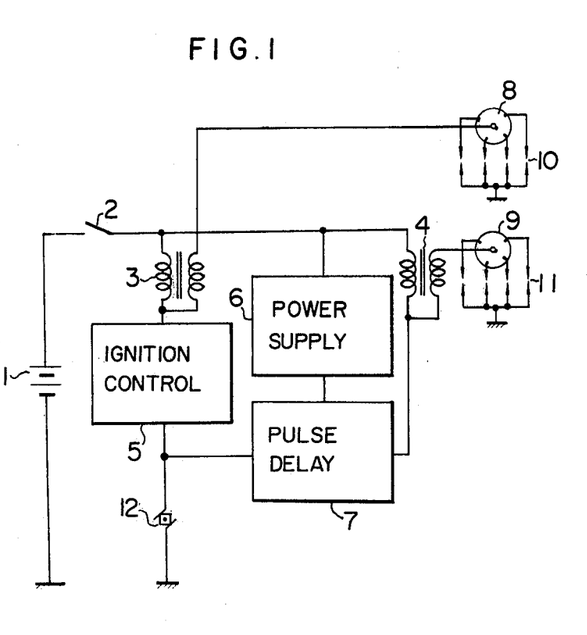
FIG. 1 is a block diagram of an ignition system of the multiple ignition combustion type to which the present invention is applied.

Referring to FIG. 1, an ignition system to which the present invention is applied includes a battery 1, an ignition switch 2, a first ignition coil 3, a second ignition coil 4, a transistor controlled ignition circuit 5, a power supply circuit 6, a pulse delay circuit 7, a first distributor 8, a second distributor 9 a first ignition plug group 10, a second ignition plug group 11, and an ignition timing detecting means or a breaker point 12 which switches on and off the base current of the transistor controlled ignition circuit 5.

Figure 2:
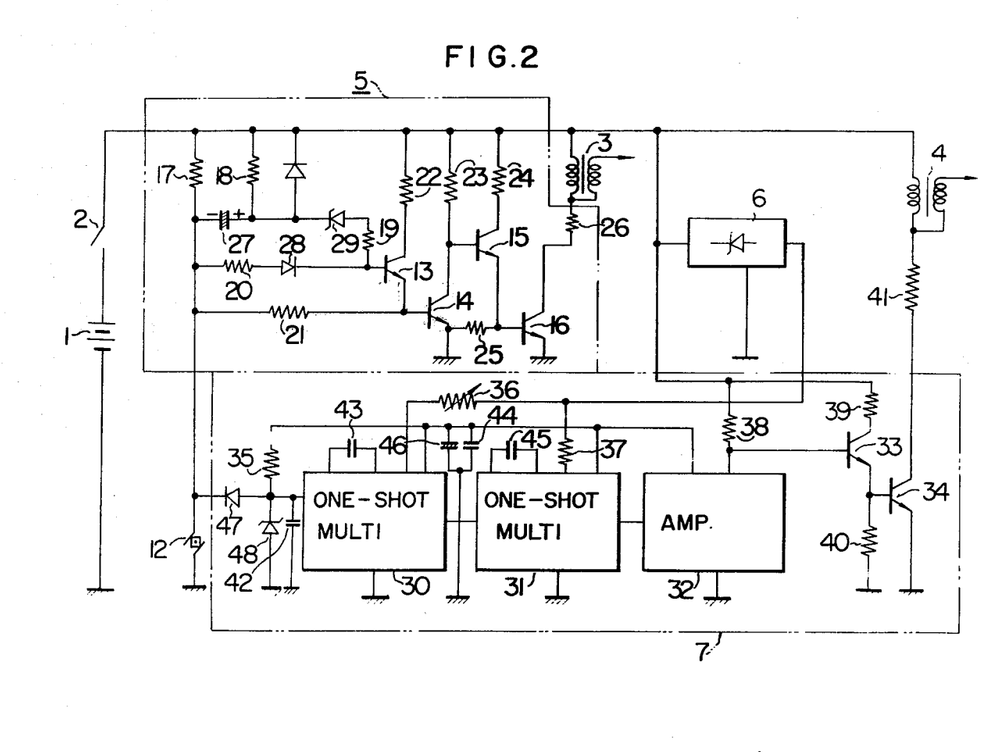
FIG. 2 is a circuit diagram of an embodiment of the present invention used in the arrangement shown in FIG. 1.

FIG. 2 shows a practical structure of one embodiment of the present invention used in the arrangement shown in FIG. 1. Referring to FIG. 2, the transistor controlled ignition circuit 5 is composed of transistors 13 to 16, resistors 17 to 26, a capacitor 27, a diode 28 and a Zener diode 29.

In the embodiment of the present invention, the intermittent current supplied to the primary winding of the first ignition coil 3 is not turned on and off by the breaker point 12, and the base current of the transistor 13 in the transistor controlled ignition circuit 5 is turned on and off by the breaker point 12 thereby switching off and on the power transistor 16. This is advantageous in that large intermittent current can be supplied to the primary winding of the first ignition coil 3 and the ignition energy supplied to the first ignition plug 3 can be increased.

The pulse delay circuit 7 is composed of a first and a second one-shot multivibrator circuit 30 and 31 of integrated circuit structure, a power amplifier circuit 32 of integrated circuit structure, power transistors 33 and 34, resistors 35 to 41, capacitors 42 to 46, a diode 47 and a Zener diode 48. In response to the application of a pulse, this circuit 7 delivers a pulse output which has a predetermined delay time and which is suitably amplified. This output is used for turning on and off the current supplied to the primary winding of the second ignition coil 4.

The operation of the embodiment of the present invention having such a structure will now be described. In operation, the ignition switch 2 is turned on to apply a d.c. voltage to the control circuit from the battery 1. In response to turn-on of the breaker point 12, the capacitor 27 is charged in an illustrated polarity and the transistor 13 is turned off. As a result, the transistor 14 is turned off, the transistor 15 is turned on, and the power transistor 16 in the last stage is turned on to supply a current to the primary winding of the first ignition coil 3.

Then, when the breaker point 12 is turned off, the voltage charged in the capacitor 27 is applied to the base of the transistor 13 through the Zener diode 29 thereby turning on the transistors 13 and 14. As a result, the base potential of the transistor 15 is reduced to zero and this transistor 15 is turned off. The power transistor 16 in the last stage is also turned off to cut off the current supplied to the primary winding of the first ignition coil 3, and a high voltage is induced in the secondary winding of this ignition coil 3. This high voltage is applied through the first distributor 8 to one of the ignition plugs in the first ignition coil group 10 so that a spark jumps across the spark gap of this ignition plug to ignite the fuel.

On the other hand, on-off of the breaker point 12 is detected by the circuit 7 and the one-shot multivibrator circuits 30 and 31 deliver respective delayed pulses of variable pulse width and constant pulse width. The delay time of these pulses is determined by the time constant of the CR combination.

Figure 3:
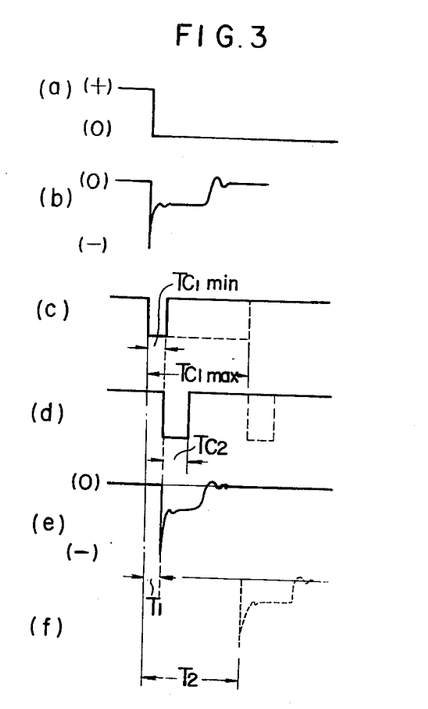
FIG. 3 shows operating waveforms appearing at various parts of the embodiment shown in FIG. 2.

A graph ($a$) of FIG. 3 shows the potential difference due to on-off of the breaker point 12. A graph ($b$) of FIG. 3 shows the waveform of the voltage appearing across the secondary winding of the first ignition coil 3. A graph ($c$) of FIG. 3 shows the waveform of the pulse output of the first one-shot multivibrator circuit 30, and a graph ($d$) of FIG. 3 shows the waveform of the pulse output of the second one-shot multivibrator circuit 31. A graph ($e$) of FIG. 3 shows the waveform of the voltage appearing across the secondary winding of the second ignition coil 4 when the delay time is minimum, and a graph ($f$) of FIG. 3 shows such voltage waveform when the delay time is maximum.

The time constant $T_{c1}$ of the first one-shot multivibrator circuit 30 is given by $T_{c1} = C_{43} \cdot R_{36}$ which is determined by the resistance $R_{36}$ of the variable resistor 36 and the capacitance $C_{43}$ of the capacitor 43. It has been experimentally proved that the practically suitable value of this time constant $T_{c1}$ lies within the range of $T_{c1}$ min = 200 $\mu$sec to $T_{c1}$ max = 3 msec.

The pulse output of the second one-shot multivibrator circuit 31 has a constant pulse width which is given by the time constant $T_{c2} \approx C_{45} \cdot R_{37}$ which is determined by the capacitance $C_{45}$ of the capacitor 45 and the resistance $R_{37}$ of the resistor 37.

The delayed pulse output obtained by the combination of the one-shot multivibrator circuits 30, 31 and the amplifier circuit 32 is used for the on-off control of the power transistor 34 thereby turning on and off the current supplied to the primary winding of the second ignition coil 4. The high voltage induced in the secondary winding of the second ignition coil 4 is applied through the second distributor 9 to one of the ignition coils in the second ignition coil group 11 so that a spark jumps across the spark gap of this ignition plug for igniting the fuel. Therefore, the difference between the ignition timing of the first ignition plug group 10 and that of the second ignition plug group 11 can be suitably varied by suitably selecting the circuit constants and suitably varying the time constants. The manner of controlling the variable resistor 36 will be described later with reference to FIGS. 6 and 8.

Figure 4:
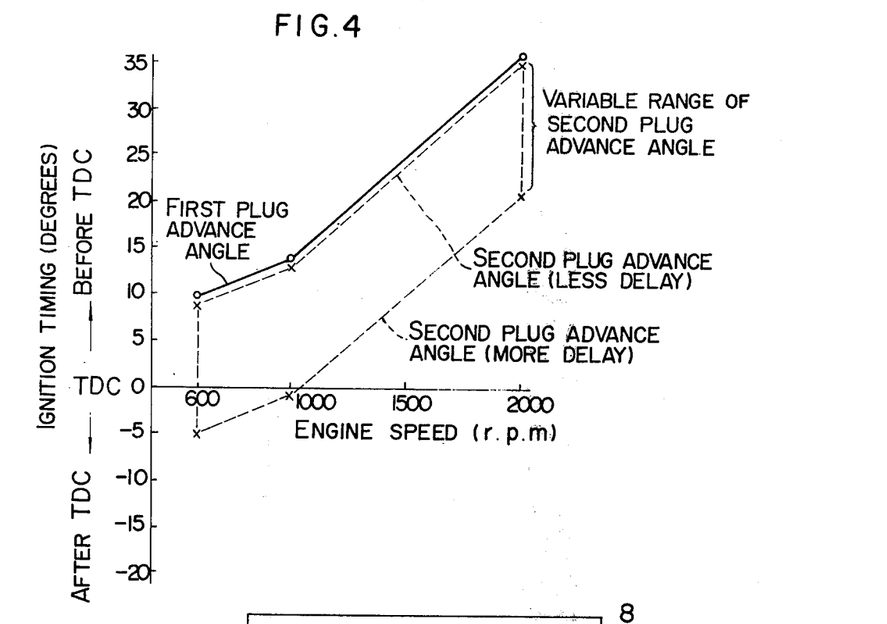
FIG. 4 is a graph showing an advance angle characteristic obtained in a test of differential ignition control by the system of the present invention.

FIG. 4 shows the results of a test to find variations in the difference between the ignition timing of the first ignition plug group 10 and that of the second ignition plug group 11 relative to the number of revolutions of the engine, hence, the vehicle speed. In FIG. 4, the ignition timing of the first ignition plug group 10 is set at an advance angle of 10° before the top dead center TDC when the engine is idling at 600 r.p.m. These data indicate the fact that the ignition timing of the second ignition plug group 11 relative to that of the first ignition plug group 10 can be freely varied within a crank angle range of 15°. Thus, the delay of the ignition timing of the second ignition plug group 11 can be controlled independently of the angle advance characteristic of the automatic angle advancing mechanism.

So-called two-point distributors having a pair of breaker points will be ordinarily required in order to attain differential ignition according to the multiple ignition combustion method, and this will result in a complex circuit structure.

Figure 5:
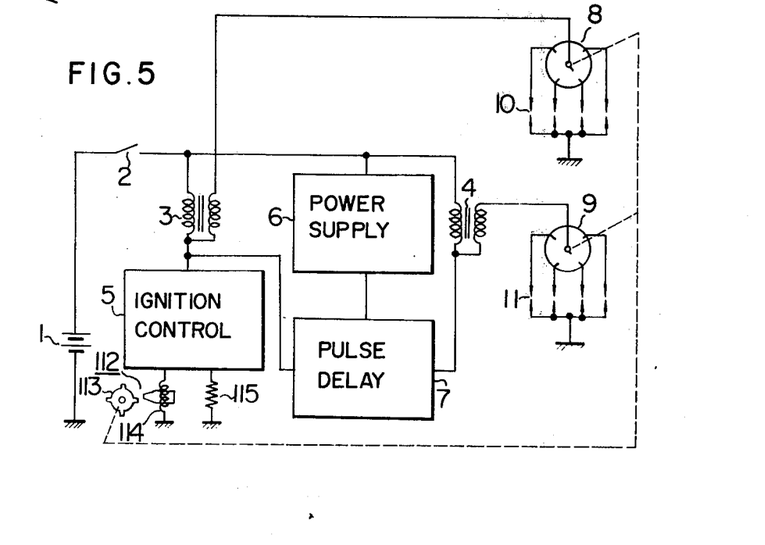
FIG. 5 is a block diagram of another ignition system of the multiple ignition combustion type to which the present invention is applied.

FIG. 5 shows another ignition system to which the present invention is applied. Referring to FIG. 5, the ignition timing detecting means in the form of the breaker point 12 shown in FIG. 1 is replaced by a contactless ignition timing detecting means 112. This contactless ignition timing detecting means 112 comprises a pickup rotor 113 rotating in interlocking relation with distributors 8 and 9 and a pickup coil 114 disposed opposite to the pickup rotor 113 and is connected to a transistor controlled ignition circuit 5 for the on-off control of the circuit 5. A resistor 115 is provided for limiting the current supplied to the primary winding of ignition coils 3 and 4.

Figure 6:
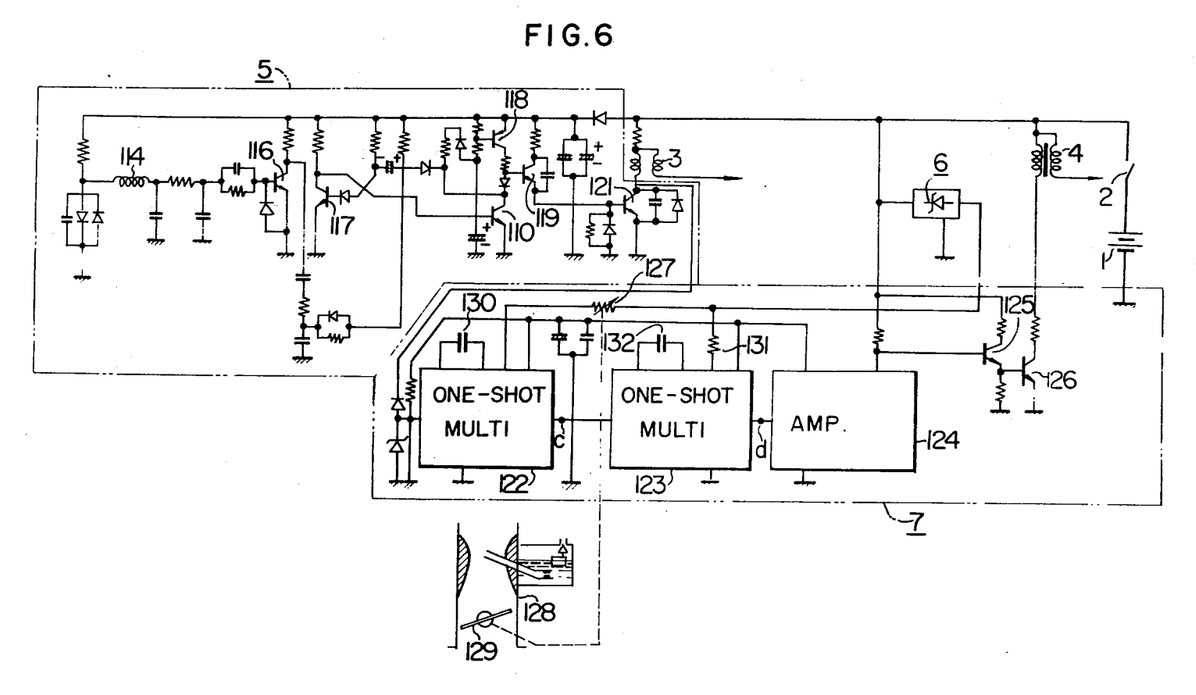
FIG. 6 is a circuit diagram of another embodiment of the present invention used in the arrangement shown in FIG. 5.

FIG. 6 shows a practical structure of another embodiment of the present invention used in the arrangement shown in FIG. 5. The transistor controlled ignition circuit 5 is composed essentially of transistors 116 to 121 which are turned on and off by the output of the pickup coil 114 for the on-off control of the current supplied to the primary winding of the first ignition coil 3.

A pulse delay circuit 7 is composed essentially of first and second one-shot multivibrator circuits 122 and 123 of integrated circuit structure, a power amplifier circuit 124 of integrated circuit structure, and power transistors 125 and 126. A power supply circuit 6 applies a constant d.c. voltage of 5 volts to the pulse delay circuit 7 for causing desired operation of the circuit 7. A variable resistor 127 is provided in the pulse delay circuit 7 for changing the time constant of the circuit 7. This variable resistor 127 is disposed for mechanically interlinking operation with the rotary shaft of a throttle valve 129 in a carburetor 128 so as to convert the opening or throttle position of the throttle valve 129 into a voltage signal.

In operation, an ignition switch 2 is turned on to apply a d.c. voltage from a battery 1 to the entire control circuit, thereby turning off the transistors 116 and 117, turning on the transistors 118 and 120, and turning off the transistors 119 and 121. In this initial state, no current is supplied to the primary winding of the first ignition coil 3, and a high voltage is not induced in the secondary winding of the first ignition coil 3.

With the rotation of the pickup rotor 113 disposed in the vicinity of the pickup coil 114, one of the projections of the pickup rotor 113 is moved to a position opposite to the pickup coil 114 and a voltage is induced in the pickup coil 114 by the magnetic field of the magnetized pickup rotor 113. A positive pulse voltage is applied to the base of the transistor 116 to turn on the transistor 116, with the result that the transistor 117 is turned on, the transistors 118 and 120 are turned off, and the transistors 119 and 121 are turned on. As a result of turn-on of the power transistor 121 in the last stage, a current is supplied to the primary winding of the first ignition coil 3. Then when the current supplied to the primary winding is cut off, a high voltage is induced in the secondary winding of the first ignition coil 3 and is applied through the distributor 8 to a first ignition plug group 10 to ignite the fuel.

It will thus be seen that the ignition timing of the first ignition plug group 10 is detected by the combination of the pickup coil 114 and the pickup rotor 113, and a very low output thus obtained is utilized to control the switching transistors in the transistor controlled ignition circuit 5 so as to carry out on-off control of the primary voltage and primary current of the first ignition coil 3 by the transistors.

On the other hand, in the case of a second ignition plug group 11, the variation in the potential of the primary winding of the first ignition coil 3 is detected so as to cause ignition of the fuel with timing which is suitably delayed relative to the ignition timing of the first ignition plug group 10. To this end, the collector potential of the switching power transistor 121 in the transistor controlled ignition circuit 5 is applied to the pulse delay circuit 7, so that the ignition timing of the second ignition plug group 11 can be delayed relative to that of the first ignition plug group 10 by the delay time which is determined by the time constant of the pulse delay circuit 7.

The first one-shot multivibrator circuit 122 in the pulse delay circuit 7 delivers a pulse whose pulse width is variable within the range of 200 $\mu$sec (minimum) and 3 msec (maximum), and the second one-shot multivibrator circuit 123 delivers a pulse of constant pulse width. The time constant $T'_{c1}$ of the first one-shot multivibrator circit 122 is determined by the resistance $R_{127}$ of the resistor 127 and the capacitance $C_{130}$ of a capacitor 130 and is given by $T'_{c1} \approx R_{127} \cdot C_{130}$. The resistor 127 is generally in the form of a potentiometer, and this potentiometer is arranged for mechanically interlinking operation with the throttle valve 129 in the carburetor 128 so that the resistance thereof is variable depending on the throttle position. Therefore, the time constant $T'_{c1}$ is variable. The time constant $T'_{c2}$ of the second one-shot multivibrator circuit 123 is determined by the resistance $R_{131}$ of a resistor 131 and the capacitance $C_{132}$ of a capacitor 132 and is given by $T'_{c2} \approx R_{131} \cdot C_{132}$. This time constant $T'_{c2}$ is maintained constant.

Figure 7:
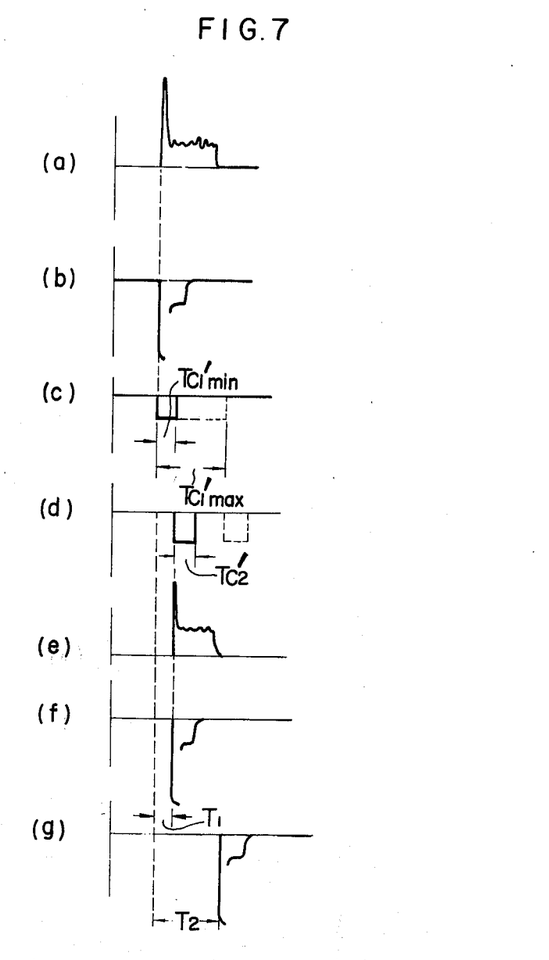
FIG. 7 shows operating waveforms appearing at various parts of the embodiment shown in FIG. 6.

A graph ($a$) of FIG. 7 shows the waveform of the voltage applied across the primary winding of the first ignition coil 3, and a graph ($b$) of FIG. 7 shows the waveform of the voltage appearing across the secondary winding of the first ignition coil 3, hence the waveform of the voltage discharged across the ignition plug of the first ignition plug group 10. A graph ($c$) of FIG. 7 shows the waveform of the output of the first one-shot multivibrator circuit 122, that is, the pulse waveform appearing at a point $c$ (FIG. 6). The time constant $T'_{c1}$ of this multivibrator circuit 122 can be freely varied within the range of $T'_{c1}$ min = 200 $\mu$sec to $T'_{c1}$ max = 3 msec by varying the resistance to the potentiometer 127. A graph ($d$) of FIG. 7 shows the waveform of the output of the second one-shot multivibrator circuit 123, that is, the pulse waveform appearing at a point $d$ (FIG. 6). The pulse width of this pulse waveform is constant. A graph ($e$) of FIG. 7 shows the waveform of the voltage applied across the primary winding of the second ignition coil 4, and this voltage waveform appears in synchronous relation with the falling edge of the pulse waveform shown in the graph ($d$) of FIG. 7. A graph ($f$) of FIG. 7 shown the waveform of the voltage appearing across the secondary winding of the second ignition coil 4 when the delay time is $T_1$. A graph ($g$) of FIG. 7 shows the waveform of the voltage appearing across the secondary winding of the second ignition coil 4 when the delay time is $T_2$. It will thus be seen that, by suitably varying the time constant $T'_{c1}$ of the first one-shot multivibrator circuit 122 within the range of $T'_{c1}$ min to $T'_{c1}$ max, the ignition timing of the second ignition plug group 11 can be suitably delayed relative to that of the first ignition plug group 10.

This difference between the ignition timing of the first ignition plug group 10 and that of the second ignition plug group 11 can be obtained by varying the resistance of the potentiometer 127. Due to the fact that the resistance of the potentiometer 127 is variable depending on the opening of the throttle valve 129 in the carburetor 128, the difference in the ignition timing may be selected to be reduced when a higher output is required due to an increase in the load, so that the engine can operate with the desired performance in a high output range while satisfying the demand for reduction of $NO_x$ in the exhaust gases.

Figure 8:
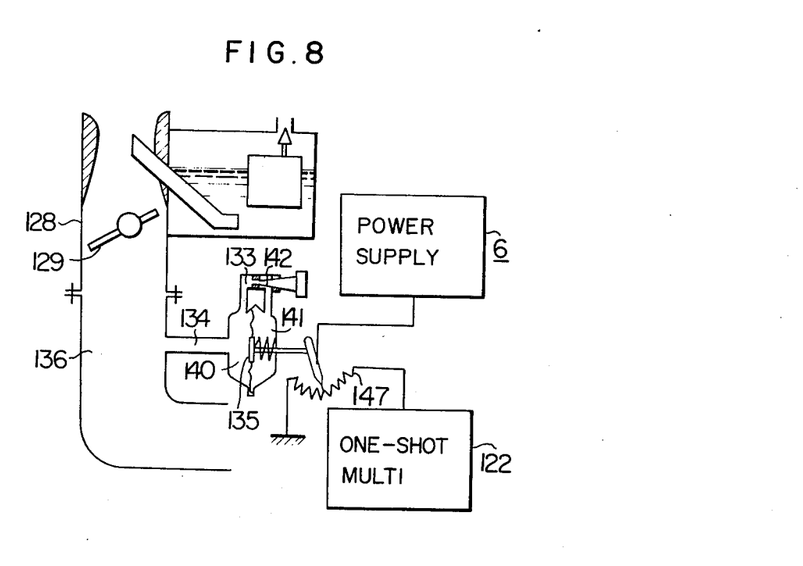
FIG. 8 is a diagrammatic view showing parts of another embodiment of the present invention.

FIG. 8 shows another embodiment of the present invention. Referring to FIG. 8, a potentiometer 147 detects an increase in the speed of the engine. More precisely, the potentiometer 147 is mechanically connected to a diaphragm 135 which is responsive to the negative pressure in a suction manifold 136. A chamber 140 is connected directly to the suction manifold 136 by a pipe 134, and another chamber 141 communicates with the chamber 140 through a passage 133 having an adjustable orifice 142 therein. During a steady operation range of the engine in which a high output is not required, the pressure within the chamber 140 is equal to that within the chamber 141. However, when the speed of the engine is increased, the negative pressure within the chamber 140 drops earlier than the drop of the negative pressure within the chamber 141, and the diaphragm 135 is biased to the left in FIG. 8 to cause a corresponding variation in the resistance of the potentiometer 147. Thus, the difference between the ignition phase of the first ignition plug group 10 and that of the second ignition plug group 11 is reduced with the increase in the acceleration. The acceleration may be detected by an electrical circuit which delivers a differentiated output representative of the throttle position of a throttle valve 129. Further, the potentiometer 147 may be controlled by both the engine output and the acceleration.

In the embodiment shown in FIG. 6, a contactless ignition timing detecting means is employed in place of the prior art breaker point of the mechanical contact type. This is advantageous in that the reliability and durability of the system can be remarkably improved.

It will be understood from the foregoing detailed description that the present invention provides a differential ignition timing control system for an internal combustion engine of the multiple ignition combustion type having a pair of ignition plugs in each combustion chamber, in which means are provided for delaying the ignition phase of one of the ignition systems by a suitable angle relative to the ignition phase of the other ignition system. Thus, in a relatively low output range, a great difference is produced between the ignition timing of one of the ignition systems and that of the other ignition system so as to reduce the quantity of $NO_x$ and to accelerate the thermal reaction in the reactor for accelerating the oxidation of HC and CO. On the other hand, only when the speed of the engine is increased to develop a higher output or when the throttle valve is fully opened to develop the full output, the delayed ignition phase is advanced to obtain the desired high output thereby ensuring the desired performance of the engine in the high output range. The present invention is thus very advantageous in that the contradictory demands, that is, the demand for the purification of engine exhaust gases and the demand for the attainment of desired engine operating performance can be simultaneously satisfied. The present invention is further advantageous in that the system is free from mal-operation due to high-frequency noise applied from the high voltage portion due to the fact that integrated circuits are used in the pulse delay circuit.

What is claimed is:

1. An ignition timing control system for a reciprocating internal combustion engine having a first spark plug and a second spark plug in each combustion chamber comprising;
    first means for generating an output representative of an operating parameter of the engine;
    ignition timing detecting means for generating a trigger signal;
    a pulse amplifier generating a first pulse signal for actuating the first spark plug in response to the trigger signal from said ignition timing detecting means; and
    a pulse delay amplifier having
    a. a first pulse generator for generating a second pulse signal in response to said first pulse signal, said second pulse signal having a pulse width which is continuously variable substantially in accordance with the output of said first means, and
    b. a second pulse generator generating a third pulse signal for actuating the second spark plug in response to the trailing end of the second pulse signal, the initiation of the third pulse signal being delayed from the first pulse signal by the time interval corresponding to the width of the second pulse signal, so that the interval of time between operations of said first and second spark plugs is varied with the variation of the output of said first means.

2. An ignition timing control system as claimed in claim 1, further comprising means for changing a time constant of the first pulse generator for changing the width of the second pulse signal.

3. An ignition timing control system as claimed in claim 1, wherein said first means comprises a throttle valve for controlling the amount of air-fuel mixture supplied to the engine, so that said second pulse signal has a pulse width which is continuously variable substantially in inverse proportion to the amount of opening of the throttle valve, and so that the interval of time between operations of said first and second spark plugs is varied with the variation of the amount of opening of the throttle valve.

4. An ignition timing control system as claimed in claim 1, wherein said first means comprises means, responsive to the negative pressure in a suction manifold of the engine, for generating an output representative thereof, so that said second pulse signal has a pulse width which is continuously variable substantially in inverse proportion to an increase in the acceleration of the engine, and so that the interval of time between operations of said first and second spark plugs is varied with the variation of the negative pressure in said suction manifold.

5. In a reciprocating piston internal combustion engine including a first spark plug and a second spark plug in each combustion chamber, and means for generating an output representative of an operating parameter of the engine, the improvement comprising:
    first means, responsive to the rotation of the engine crankshaft, for generating a trigger signal;
    second means, coupled between said first means and said first spark plug, for supplying a first pulse signal to said first spark plug in response to the generation of said trigger signal; and
    third means, coupled between said second means and said second spark plug, for supplying a second pulse signal to said second spark plug, said second pulse signal being delayed relative to said first pulse signal by a time interval which is proportional to the output from said means for generating an output representative of an operating parameter of the engine, so that said time interval and, accordingly, the delay of operation of said second spark plug relative to said first spark plug, is continuously variable with the variation of said operating parameter of the engine.

6. The improvement according to claim 5, wherein said third means comprises
    a first pulse generator, responsive to said first pulse signal, for generating a first delay pulse the width of which is proportional to the degree of opening of said throttle valve, and a second pulse generator, coupled to said first pulse generator, for generating said second pulse signal upon the termination of said first delay pulse.

7. The improvement according to claim 6, wherein said first pulse generator comprises a monostable multivibrator having a variable resistor for controlling the time constant thereof, said variable resistor being coupled to a throttle valve of the engine so that the resistance of said valuable resistor is established in accordance with the degree of opening of said throttle valve.

8. The improvement according to claim 7, wherein said second pulse generator includes a monostable multivibrator having a fixed time constant.

9. The improvement according to claim 6, wherein said first pulse generator comprises a monostable multivibrator having a variable resistor for controlling the time constant thereof, said variable resistor being responsive to the negative pressure in the suction manifold of the engine.

10. An ignition timing control system for a a reciprocating internal combustion engine having a first spark plug and a second spark plug in each combustion chamber comprising:

first means for generating an output representative of an operating parameter of the engine;

ignition timing means for generating a trigger signal;

a pulse amplifier generating a first pulse signal for actuating the first spark plug in response to the trigger signal from said ignition timing means;

a pulse delay amplifier having
  a. a first monostable-multivibrator generating a second pulse signal of variable pulse width in response to said first pulse signal, and
  b. a second monostable-multivibrator generating a third pulse signal for actuating the second spark plug in response to the trailing end of the second pulse signal, the initiation of the third pulse signal being delayed from the first pulse signal by a time interval corresponding to the width of the second pulse signal; and second means for changing the width of the second pulse signal substantially in accordance with the output of said first means, so that the interval of time between operations of said first and second spark plugs is continuously varied with the variation of the output of said first means.

11. An ignition timing control system as claimed in claim 10, wherein said first means comprises a throttle valve for controlling the amount of air-fuel mixture supplied to the engine, so that said second pulse signal has a pulse width which is continuously variable substantially in inverse proportion to the amount of opening of the throttle valve, and so that the interval of time between operations of said first and second spark plugs is varied with the variation of the amount of opening of the throttle valve.

12. An ignition timing control system as claimed in claim 10, wherein said first means comprises means, responsive to the negative pressure in a suction manifold of the engine, for generating an output representative thereof, so that said second pulse signal has a pulse width which is continuously variable substantially in inverse proportion to an increase in the acceleration of the engine, and so that the interval of time between operations of said first and second spark plugs is varied with the variation of the negative pressure in said suction manifold.

13. An ignition timing control system as claimed in claim 11, in which said pulse width changing means includes a variable resistor, whose resistance changes in substantially inverse proportion to the amount of opening of said throttle valve.

14. A system for controlling the ignition of fuel in an internal combustion engine with differential ignition timing, comprising:

a first and a second ignition plug disposed in each combustion chamber of the engine;

a contactless ignition timing detecting means;

a first ignition system connected to said ignition timing detecting means for applying a first ignition signal to said first ignition plug in response to the output signal of said ignition timing detecting means, said first ignition system including a first ignition coil and a transistor controlled ignition circuit, said first ignition coil including a preimary winding and a secondary winding connected to said first ignition plug, said transistor controlled ignition circuit including a transistor switching means for intermittently supplying a current to said primary winding of said first ignition coil in response to the output of said contactless ignition timing detecting means; and a second ignition system including a second ignition coil and a delay circuit for retarding the ignition timing of said second ignition plug than the ignition timing of said first ignition plug, said second ignition coil including a primary winding and a secondary winding connected to said second ignition plug, said delay circuit including a first and a second one-shot multivibrator circuit, said first one-shot multivibrator circuit being adapted to produce a first delayed pulse having a freely variable delay time in response to the intermittent current flowing through said primary winding of said first ignition coil, said second one-shot multivibrator circuit being adapted to produce a second delayed pulse having a predetermined delay time in response to the first delayed pulse so as to intermittently supply a current to said primary winding to said second ignition coil.

15. A system as claimed in claim 14, wherein a driving power supply circuit is provided for supplying driving power to said pulse delay circuit.

16. A system as claimed in claim 14, wherein said pulse delay circuit includes a variable resistor means constituting a part of a variable time constant circuit for varying the variable delay time of said first delayed pulse.

17. A system as claimed in claim 16, wherein said variable resistor means is controlled in such a manner that the resistance thereof is variable depending on the movement of a diaphragm which is responsive to the negative pressure in the suction manifold of said engine.

18. A system as claimed in claim 16, wherein said variable resistor means is controlled in such a manner that the resistance thereof is variable depending on the opening of the throttle valve in the carburetor of said engine.

* * * * *